CHECKERBRICK AND CHECKERWORK CONSTRUCTION FOR REGENERATORS
Original Filed Oct. 10, 1967
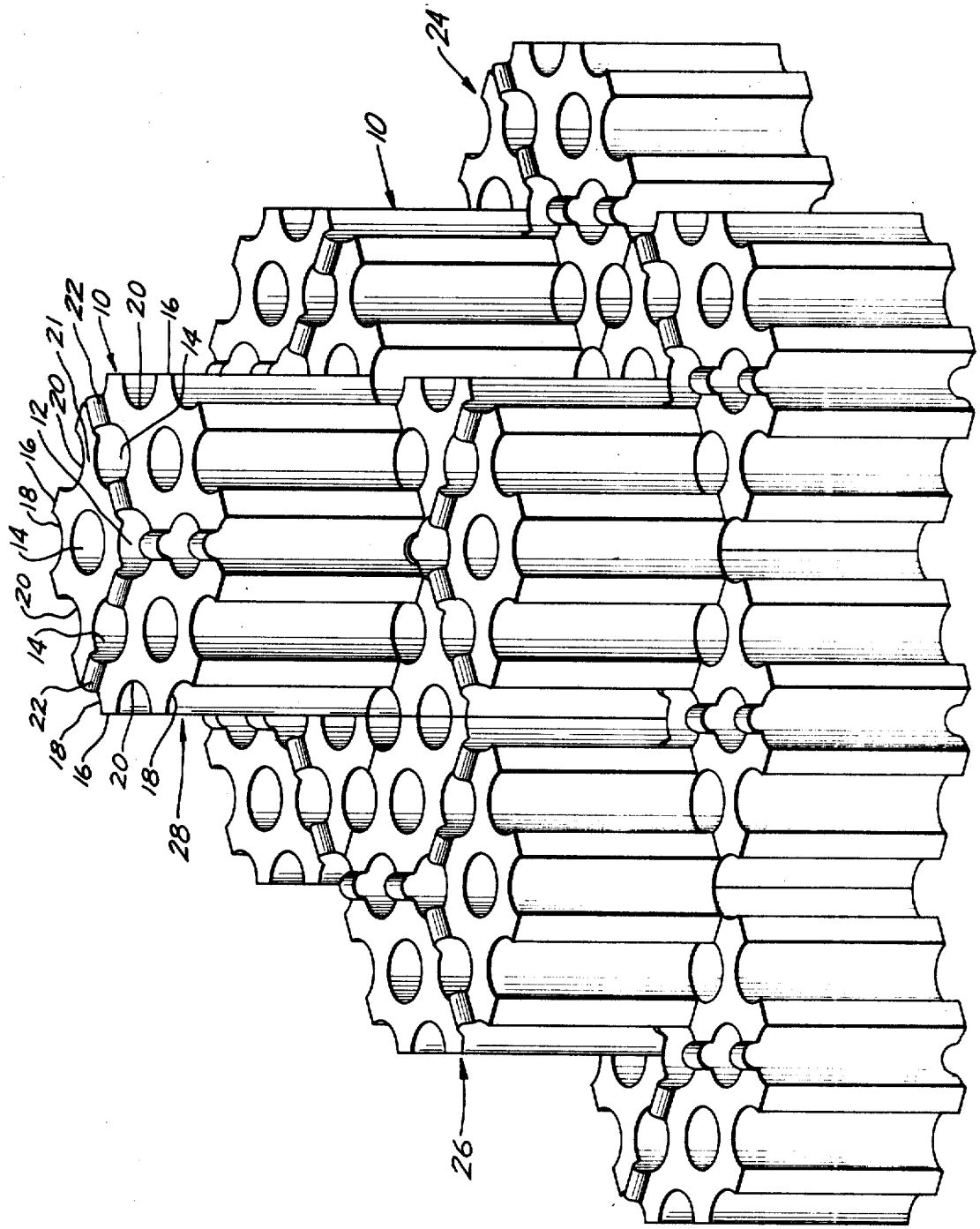
INVENTORS.
CHARLES R. HAUTH
LARRY L. SHEATSLEY
BY
William C. Roeder
ATTORNEY United States Patent Office Re. 27,020
Reissued Jan. 5, 1971

27,020

CHECKERBRICK AND CHECKERWORK CONSTRUCTION FOR REGENERATORS

Charles R. Hauth, Upper St. Clair, Pittsburgh, and Larry L. Sheatsley, Bethel Park, Pa., assignors to Dresser Industries, Inc., Dallas, Tex., a corporation of Delaware Original No. 3,436,064, dated Apr. 1, 1969, Ser. No. 674,327, Oct. 10, 1967. Application for reissue Nov. 18, 1969, Ser. No. 871,503

Int. Cl. F23l *15/02*

U.S. Cl. 263—51 7 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to improvements in heat exchangers and is directed particularly to improved design for checkerbrick and checkerwork construction for blast furnace stoves. Specifically, in an assembly of checkers, the invention is directed to multi-sided checkerbrick having symmetrically arranged internal apertures and external grooves and which is divided into equal segments by projections and complementary recesses to permit staggering of courses of checkerbrick throughout the vertical extent of the construction while maintaining alignment of the apertures in the checkerbrick and formed by combinations of checkerbrick.

Heat exchangers, stoves or regenerators used in connection with metallurgical furnaces consist of chambers in which are stacked checkerbrick substantially to the full height of the chamber. The functions of the checkerbrick or checkerwork construction is to absorb heat from the products of combustion produced in the burning of the fuel in the furnace and to give up the absorbed heat to air used in running or operating the furnace. In the operation of blast furnaces, for example, the conventional practice is to have each stove put on the blast furnace in sequence, supplying the heated air for a period of from one to two hours, and in turn, being reheated for a period of two to four hours. Other heat exchangers, commonly called regenerators in glass tank and open hearth furnaces operate similarly.

The efficiency of the stoves or regenerators is dependent to a great measure upon the efficiency of the heat absorbing capacity or ability of the checkerbrick and this affects to a great extent the efficient function of the furnace.

Many checker assemblies range to heights of about 100 feet. With such heights, during operation of the metallurgical vessel, it is difficult to maintain the initial columnar arrangement of checkerbrick owing to shifting of the brick during expansion and contraction of abutting brick in adjacent and common courses. The displacement of brick in the checkerwork structure, of course, causes misalignment of the apertures from top to bottom and reduces the efficiency of the stoves.

Accordingly, it is an object of the present invention to provide improved checkerbrick construction whereby greater and more rapid heat absorption will be obtained with consequent increased economy in the operation of stoves and regenerators of furnaces.

Another object of the invention is to provide a checkerwork construction whereby the efficiency of the stoves or regenerators are maintained.

Another object of the invention is to provide a checkerwork assembly in which the checkerbrick in adjacent courses are interlocked and the joints staggered to provide a structurally integral assembly from top to bottom.

A still further object of the invention is to provide a checkerwork assembly wherein the apertures formed from top to bottom of the assembly maintain their alignment during operation of the furnace.

In order to more fully understand the nature and objects of the invention, reference should be had to the following detailed description and drawing, the single figure of which is a perspective view of a portion of a checkerwork construction made up in accordance with the present invention.

In accordance with the present invention, there is provided an assembly of checkers forming a checkerwork contruction. The construction consists of multisided checkerbrick in which the sides are equally dimensioned and are bounded by opposed ends. The checkerbrick contain a plurality of apertures symmetrically arranged about a central aperture and extending between opposed ends. There are external grooves in the faces symmetrically arranged about the periphery thereof. One end of the checkerbrick contains [projections] *tongues* extending from the central aperture to the outer periphery of the brick, while the other end contains complementary [recesses] *grooves* similarly disposed. The [projections] *tongues* and complementary [recesses] *grooves* divide the checkerbrick into equal segments, the number of segments being equal to one half the number of sides.

A plurality of the multi-sided checkerbrick form a base course in the assembly of checkers. The brick are disposed so that each side is in contiguous contact with a side of a similar checkerbrick except the outermost ones which are in contact with special shapes to secure the outer boundaries. Each external groove in the faces of the checkerbrick form an aperture with the grooves in adjacent checkerbrick. Above the base course are additional courses of checkerbrick extending upwardly. The checkerbrick in each course are disposed in a similar relationship as the base course. Each checkerbrick in each course is also disposed so that a [projection] *tongue* and [recess] *groove* on opposed ends is complementarily mated with a [projection] *tongue* and [recess] *groove* of checkerbrick in adjacent courses so that the ends of each brick are in contiguous contact with segments of the ends of the number of checkerbrick in adjacent courses. The number contacted is equal to ½ the number of sides of each checkerbrick to provide staggered joints between brick in adjacent courses. The apertures in the checkerbrick and those formed by the external grooves in each course are in alignment with the apertures in adjacent courses.

Referring to the drawing, there is shown a partial assembly of checkers. The checkers chosen for illustration have a cross-section in the shape of a regular hexagon, i.e., exterior flat surfaces lie in an equiangular, equilateral hexagon. Medially of the checkerbrick 10 is a central aperture 12. Symmetrically disposed in a circle about the central aperture are six other apertures 14. The equidimensioned side surfaces 16 are joined by arcuate portions or grooves 18. Each of the six encircling apertures are disposed substantially equidistantly between a groove 18 joining two sides and the central aperture 12. Also, a groove 20 extends transversely of the checkerbrick in each side surface 16.

One end 21 of the checkerbrick contains [projections] *tongues* 22 extending from the central aperture 12 to the groove 18 joining two sides. The linear boundaries of the [projections] *tongue* are interrupted by the apertures 14 passing transversely through the checkerbrick. On the opposite end (not shown) of the checker are complementary [recesses] *grooves* which are disposed similarly to the [projections] *tongues*. The [projections] *tongues* and complementary [recesses] *grooves* divide the checkerbrick into three equal segments. [The segments are characterized in a broad embodiment as those which are at a lower elevation than the projections on one end and those which are at a higher elevation than the recesses on the other end.]

Each of the checkerbrick in the base course 24 and upper adjacent courses 26, 28, etc., are disposed so that each side 16 is in contiguous contact with the sides of six other checkerbrick in that course, except for the outermost checkerbrick in each course. Additional special shapes would have to be employed adjacent the outermost checkerbrick to prevent a seriated effect. However, such shapes are beyond the scope of this invention.

The grooves 20 in the side surfaces 16 and the grooves 18 joining side surfaces in each checkerbrick form an aperture with the grooves in adjacent checkerbrick. All of the apertures thus formed are of substantially the same size. The checkerbrick in the upper courses of the assembly lie in a similar relationship with the brick in that course. Further, each checkerbrick in each course, except the upper-most and lower-most or base courses, as one [projection] *tongue* and [recess] *groove* on opposed ends complementarily mated with one [projection] *tongue* and [recess] *groove* of a checkerbrick in an adjacent course so that the ends of each checkerbrick are in contiguous contact with the ends of three of the checkerbrick in adjacent courses to provide staggered joints between checkerbrick in adjacent courses.

Owing to the symmetrical arrangement of each internal aperture and external groove, in the checkerbrick and the means for segmenting the checkerbrick for interlocking purposes, all of the apertures and those thus formed by the external grooves are in alignment with apertures in adjacent courses from the upper-most course to the base.

While the invention has been described with reference to a six-sided, regular hexagon shape, it should be understood that the essence of the present invention applies to other shapes having an even number of sides. [Further, while the drawing shows the projections and recesses segmenting the shapes to be of a certain configuration, it should be understood that other configurations may be employed embodying the concepts of the invention without departing from its scope.]

I claim:

1. In combination, in an assembly of checkers, multisided checkerbrick, said sides being equally dimensioned, opposed ends bounding the sides, a plurality of apertures symmetrically arranged about a central aperture extending between opposed ends, external grooves in said sides extending between opposed ends symmetrically arranged about the periphery thereof, [projections] *tongues* on one of said ends extending from the central aperture to the outer periphery of said checkerbrick, complementary [recesses] *grooves* similarly disposed on the opposite end, said [projections] *tongues* and complementary [recesses] *grooves* dividing the checkerbrick into equal segments, the number of segments being equal to one-half the number of sides, a plurality of said multisided checkerbrick forming a base course in the assembly of checkers, said checkerbrick disposed so that each side is in contiguous contact with a side of a similar checkerbrick except outermost checkerbrick, each external groove in the faces of the checkerbrick forming an aperture with the grooves in adjacent checkerbrick, additional courses of checkerbrick disposed thereabove in similar relationship, each checkerbrick in each course having a [projection] *tongue* and [recess] *groove* on opposed ends complementarily mated with a [projection] *tongue* and [recess] *groove* of checkerbrick in adjacent courses, so that the ends of each checkerbrick are in contiguous contact with segments of the ends of a number of checkerbrick in adjacent courses, said number being equal to one-half the number of sides of the checkerbrick, to provide staggered joints between checkerbrick in adjacent courses, the apertures in the checkerbrick and those formed by the external grooves in each course being in alignment with apertures in adjacent courses.

2. A multisided checkerbrick having equally dimensioned sides and opposed ends bounding the sides, a plurality of apertures symmetrically arranged about a central aperture extending between opposed ends, external grooves in said sides extending between opposed ends symmetrically arranged about the periphery thereof, [projections] *tongues* on one of said ends extending from the central aperture to the outer periphery of said checkerbrick, complementary [recesses] *grooves* similarly disposed on the opposite end, said [projections] *tongues* and complementary [recesses] *grooves* dividing the checkerbrick into equal segments, the number of segments being equal to one-half the number of sides.

3. The checkerbrick of claim 2 which contains in addition, external grooves joining the sides and extending between opposed ends.

4. The combination of claim 1 in which the checkerbrick contains, in addition, external grooves joining the sides and extending between opposed ends.

5. The combination of claim 3 in which the checkerbrick has a cross-sectional contour in the form of a regular hexagon.

6. The checkerbrick of claim 4 in which each aperture arranged about the central aperture is disposed substantially equidistantly between the central aperture and the groove joining two sides and is in alignment therewith.

7. The combination of claim 4 in which the complementary [projections] *tongues* and [recesses] *grooves* have boundaries interrupted by the internal apertures and from the central aperture to the groove joining two sides.

References Cited

The following references, cited by the Examiner, are of record in the patented file of this patent or the original patent.

UNITED STATES PATENTS

| | | | |
|---|---|---|---|
| 1,792,663 | 2/1931 | Strack | 263—51 |
| 2,493,458 | 1/1950 | Koenig | 263—51 |

FOREIGN PATENTS

| | | | |
|---|---|---|---|
| 994,833 | 6/1965 | Great Britain | 263—51 |

JOHN J. CAMBY, Primary Examiner